3,047,522
PROCESS FOR EXTENDING THE FILM FORMING LIFE OF A LATEX OF A CRYSTALLINE VINYLIDENE CHLORIDE-ACRYLONITRILE COPOLYMER

Roland H. Gray, Jr., Midland, Raymond J. Rygwelski, Auburn, and Ronald G. Tigner, Midland, Mich., assignors to The Dow Chemical Company, Midland, Mich., a corporation of Delaware
No Drawing. Filed Aug. 24, 1956, Ser. No. 605,953
1 Claim. (Cl. 260—29.6)

This invention relates to improvements in the film forming properties of latexes of polymers and copolymers. More particularly it relates to an improved process of extending the useful film forming life of aqueous latexes of normally crystalline polymers and copolymers.

Unsupported films prepared from normally crystalline polymers and copolymers have properties which make them very useful as packaging materials. For example, the films prepared from crystalline copolymers composed predominantly of vinylidene chloride show a high resistance to the transmission of moisture vapor. However, it is difficult to prepare such films by conventional extrusion methods, because of the extreme sensitivity of such copolymers to heat. The lack of solubility in the common volatile solvents precludes the usual solvent casting techniques. It would be desirable to cast such films from those aqueous latex-like dispersions resulting from the emulsion polymerization of the monomers. It is well known that to be able to cast continuous coherent films from aqueous unplasticized polymer latexes, the polymer must be predominantly in the amorphous state. It is equally well known that the latexes are in that amorphous state immediately following polymerization but that the polymer crystallizes rapidly thereafter so that in most cases the polymer latex is not film forming after about two days. In the past it was necessary to cast films from those latexes shortly after they were prepared if continuous coherent films were desired. If crystallization of the copolymer was allowed to proceed for even a short time, the deposited film would dry into a flaky, discontinuous film that was useless for commercial purposes. It would be desirable to have a process for extending or prolonging the amorphous life of a copolymer in an aqueous dispersion so that the dispersion could be stored or transported without crystallization taking place in amounts that would prohibit the formation of continuous coherent films.

It is accordingly an object of this invention to provide a process for extending the amorphous life of a freshly prepared latex of a normally crystalline polymer.

The above and related objects are accomplished by a process whereby immediately after the emulsion polymerization has reached the desired conversion a minor amount of additional monomer is added to the latex after which the latex is placed in a substantially hermetically sealed container and stored at a temperature above which the latex is coagulated by freezing and below 20° C.

Although any polymer latex may be treated in accordance with this invention, it has been found that the process is particularly well adapted for use in preserving or extending the useful film forming life of the normally crystalline vinylidene chloride latexes. The polymer of those latexes is initially in a substantially amorphous state from which it is film forming. However, immediately following polymerization an irreversible crystallization proceeds at a rate which is dependent to some extent upon the polymer composition, until an amount of crystallization is obtained at which the latex is no longer capable of depositing useful continuous, coherent films. In latex form that crystallization of the polymer cannot be inhibited. However, the process of this invention materially extends that useful film forming life by retarding the rate of crystallization of the polymers.

The formation of aqueous latexes of polymeric materials is well known in the art. Typically, the monomeric materials are introduced into an aqueous phase containing a water soluble polymerization catalyst such as potassium persulfate and a surface active agent capable of emulsifying the polymerizable substances. Examples of suitable emulsifiers are the soluble salts of long chain alkyl sulfates or sulfonates or petroleum hydrocarbon sulfonates or the like. The polymerization is usually carried out by heating the aqueous emulsion of said mixture at temperatures between 40° and 60° C. with at least initial agitation. After polymerization is complete the resulting latex is filtered to remove any precoagulum.

Latexes which are to be used in forming films should preferably contain from 30 to 50 percent of non-volatile solids. When less than 30 percent solids are present in the latex, no useful films may be formed by simple casting techniques regardless of the degree of crystallinity in the polymeric particles. Latexes having appreciably more than 50 percent solids are difficult to prepare and are extremely sensitive to mechanical shear and may coagulate prematurely.

The quality of dried films prepared by casting a latex is also dependent upon the particle size of the latex. The particle size is known to be principally a function of the emulsifier used, of the temperature employed during polymerization and of particle size controlling additives, and a latex of a normally crystalline polymer will not form a film unless substantially all of the particles are under 2000 Angstrom units in diameter. Most desirable results are obtained when the majority of the dispersed polymer particles have diameters between 700 and 1200 Angstrom units. Means for making latexes whose particles are of these dimensions are well known.

The comonomer to be added following polymerization is the comonomer to the vinylidene chloride and may be used in any amount less than that known to coagulate the latex. For example when the polymer latex is prepared from vinylidene chloride and acrylonitrile, the added monomer will be acrylonitrile in amount which should not be over 5 percent of the total monomer charge. If greater amounts are used the composition of the polymer may be appreciably changed and the latex may coagulate prematurely. It has been found that less monomer is required to coagulate latexes of high conversion or high solids than those of low conversion and low solids. The amount to be used may be determined by simple side experiments.

The added monomer may be incorporated into the latex after polymerization in the latex has proceeded to the desired degree and preferably after polymerization has been stopped by reducing the temperature but before the polymerized latex has had a chance to cool to room temperature. It is significant that the added monomer be fresh uncatalyzed monomer. The same useful result is not obtained when polymerization is carried to much less than the desired conversion of monomers to polymer so as to leave a quantity of unpolymerized monomer of the original polymerization charge in the latex.

Following addition of the monomer, the latex may pass through the usual processing steps such as filtering. It is then placed in substantially hermetically sealed containers for storage before use. A preferred manner of achieving such sealing is described in the example given below.

After sealing off the latex, it is stored at a temperature of from slightly above 0° to 20° C. Temperatures of 0° C. or lower will cause premature coagulation of the latex by freezing while temperatures higher than 20° C. do not retard the rate of crystallization of the polymer particles. Best results are obtained by using a temperature of from 15° to 20° C.

To preserve the film forming life of the latex for the unusually long periods resulting from this process it is necessary that all of the steps of adding monomer, storing the latex in sealed containers and at the specified temperature be employed. Thus, if a latex does not have the added monomer but is stored in sealed containers at the proper temperatures, less extension of the film forming life will be exhibited than when the monomer is added. The same is true when any of the other steps are omitted.

By way of example, to an aqueous phase consisting of 100 parts by weight of water, 3 parts by weight of a water soluble anionic emulsifier, and 0.2 part by weight of potassium persulfate was added 97 parts by weight of uninhibited vinylidene chloride and 3 parts by weight of acrylonitrile. Polymerization was initiated and maintained by controlling the polymerization mixtures at 60° C. while agitated. After 5.5 hours polymerization had reached 60 percent conversion and the reactor was cooled while the contents were agitated. When the temperature of the reactants reached 58° C., 3 parts by weight of fresh acrylonitrile was added. The temperature was allowed to drop to 20° C. in the vessel to lessen monomer volatilization after which the latex was filtered and placed in containers having separate bag-like liners of a thermally extruded film prepared from 85 percent vinylidene chloride and 15 percent vinyl chloride. The tops of the liners extending above the contained latex were twisted and tied tightly and the containers were closed and stored at 15° C. The film forming ability of the latex was tested from time to time. It was found that a continuous coherent film was obtained from this latex by casting and air drying until 28 days had passed.

By way of contrast when the added 3 parts of acrylonitrile was omitted but the remainder of the process was the same as above, the film forming life of the latex was 5 days. Also when the process was repeated including the post-polymerization increment of acrylonitrile and the latex stored in sealed containers but at 30° C. the film forming life was only 6 days.

We claim:

A process for extending the useful film-forming life of a latex of a normally crystalline vinylidene chloride polymer containing from about 30 to about 50 percent by weight of polymer solids and which latex normally is capable of depositing a continuous coherent film when fresh and loses that ability on aging and which is prepared by subjecting an aqueous emulsion of vinylidene chloride and acrylonitrile to heating and catalytic conditions to cause polymerization of the monomers, said process consisting of the sequential steps of (1) adding to said latex after polymerization has stopped but before the latex has cooled to room temperature in increment of not more than 5 percent by weight of total monomers charged and less than coagulating amounts of a fresh supply of acrylonitrile, (2) sealing the so-treated latex in containers hermetically, and (3) storing the latex in the sealed containers at a temperature of from slightly above 0° C. to 20° C.

References Cited in the file of this patent

UNITED STATES PATENTS

| 2,674,593 | Condo et al. | Apr. 6, 1954 |
| 2,831,822 | Carr et al. | Apr. 22, 1958 |

FOREIGN PATENTS

| 627,265 | Great Britain | Aug. 4, 1949 |

OTHER REFERENCES

"The Chemistry of Acrylonitrile," published by American Cyanamid Company, New York, 1951, page 65.

Schildknecht: "Vinyl and Related Monomers" (1952), Wiley and Sons, pages 458–461, New York.

Scheflan et al.: "The Handbook of Solvents" (1953), Van Nostrand Company, Inc., New York City, page 91.